Sept. 20, 1932.  W. HODKINSON  1,878,518
ANIMAL FEEDING DEVICE
Filed Dec. 9, 1930  2 Sheets-Sheet 1
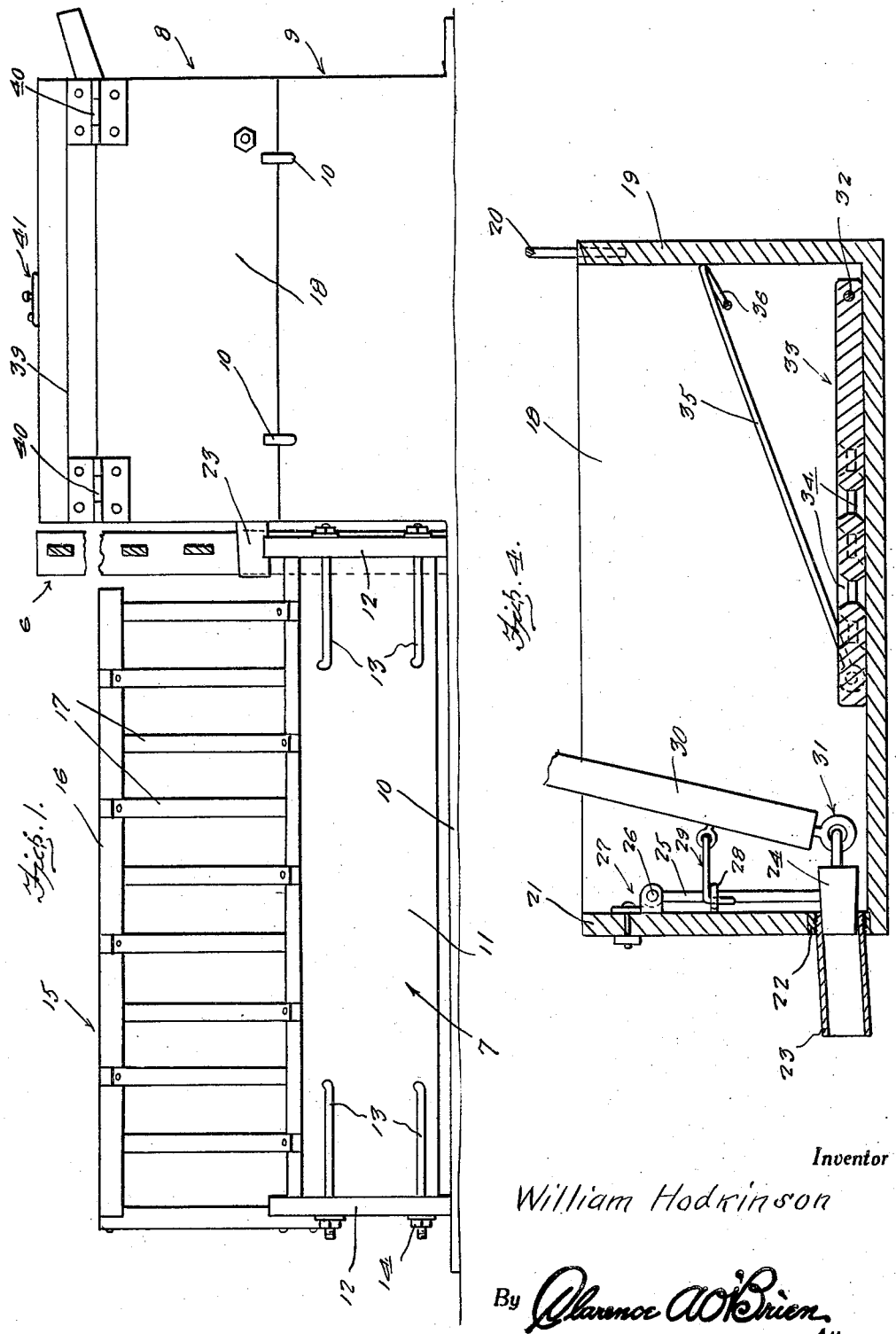
Inventor
William Hodkinson
By Clarence A O'Brien
Attorney Sept. 20, 1932.   W. HODKINSON   1,878,518
ANIMAL FEEDING DEVICE
Filed Dec. 9, 1930   2 Sheets-Sheet 2
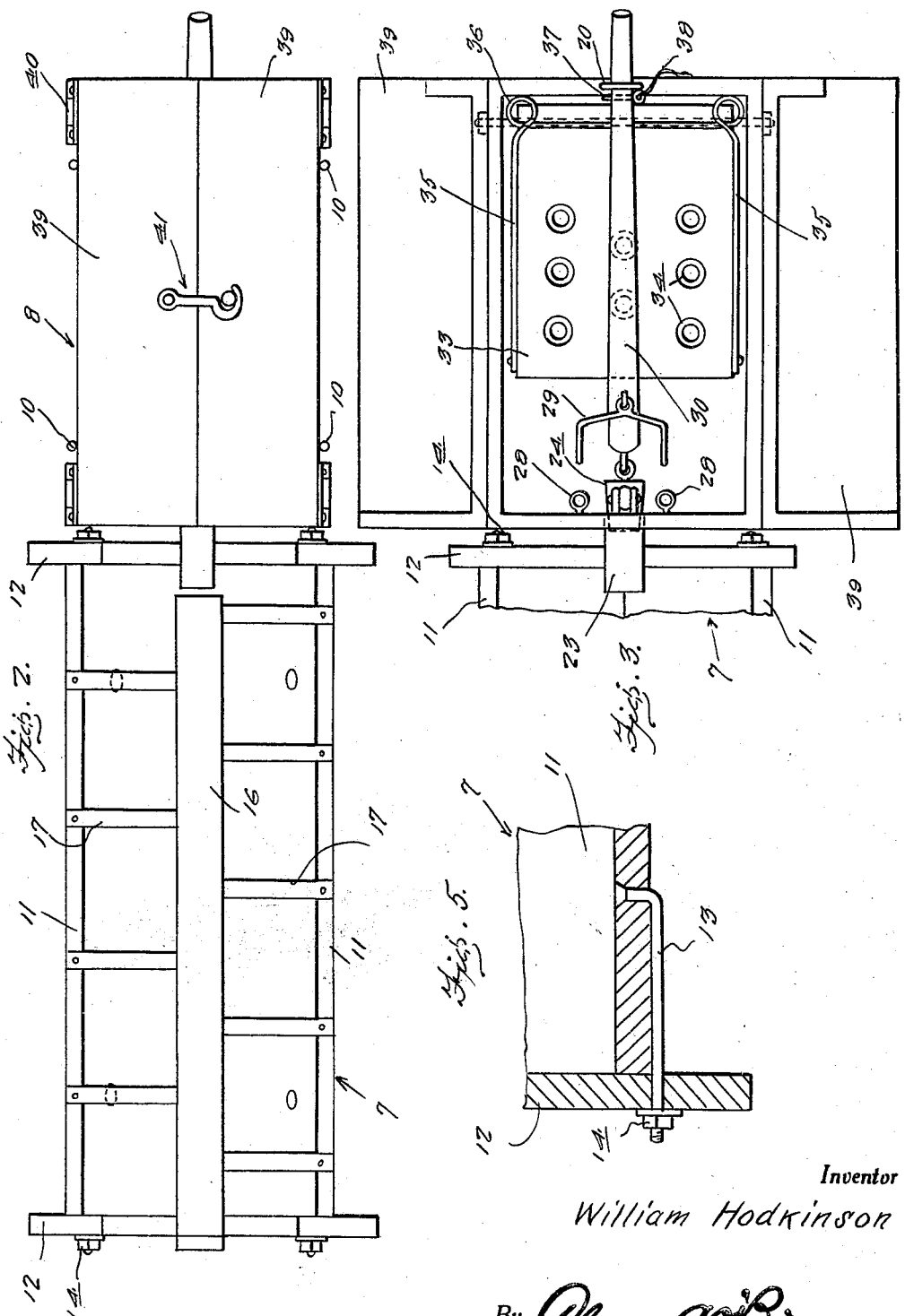
Inventor
William Hodkinson
By Clarence A. O'Brien
Attorney Patented Sept. 20, 1932

1,878,518

UNITED STATES PATENT OFFICE

WILLIAM HODKINSON, OF ALSEY, ILLINOIS

ANIMAL FEEDING DEVICE

Application filed December 9, 1930. Serial No. 501,148.

This invention relates to a farm appliance or apparatus which is primarily designed for watering and feeding hogs.

The invention has more particular reference to a structure of this general classification which is characterized by an appropriate concrete foundation or base having an elevated portion supporting a food and water containing tank and a relatively low portion supporting an especially designed trough, there being an intervening fence constituting a part of the pig pen between the trough and tank and said trough and tank having intercommunicating connection.

One feature of the inventive conception is predicated upon a portable tank receptacle characterized by hinged lids forming an appropriate closure wherein said tank is provided at one end with an appropriate discharge spout for feeding the food, slop, and water by gravity through the pen and into the receiving trough.

A further structural feature is founded upon a removable rigging within the discharge end of the tank embodying a plug valve for either closing or regulating the discharge of materials from the tank.

A further feature is founded on the utilization in the tank of an apertured paddle which is rockably mounted and provided with suitable actuating means and designed to function as an agitator for mixing and stirring the contents of the tank, whereby to condition the material and to aid in ejecting it through the outlet spout.

Then, too, in carrying the invention into practice, I have evolved and produced a simplified form of trough characterized by a sturdy and V-shaped receptacle and an overhead guard including spacing elements permitting free access to be had to the contents of the trough and at the same time preventing the animals from climbing into the trough or contaminating the trough contents by sticking the feet into the trough.

Other features and advantages will become more readily apparent from the following description and drawings. In the drawings:

Figure 1 is a side elevational view of the general assembly showing the details and relative arrangement and association and as developed in accordance with the present inventive conception.

Figure 2 is a top plan view of the assembly illustrated in Figure 1.

Figure 3 is a top plan view of the tank showing the lid swung open to disclose the details on the interior of the tank.

Figure 4 is a longitudinal sectional view through the tank.

Figure 5 is a detail view of the trough construction.

In Figure 1, the numeral 6 designates generally a divider or partition which may be a fence constituting a part of the pig pen. Located on one side of the fence is the trough 11 and on the opposite side is the tank 8. As before intimated, the tank is of a portable type and is supported on the elevated portions 9 of a concrete foundation or base. Suitable retaining elements 10 are provided for aiding in maintaining the tank 8 in place.

The trough 7 is supported on the relatively low extension 10 of the foundation. The body portion of the trough comprises V-shaped receptacle including downwardly converging walls or boards 11 attached to end members 12. The end members extend outwardly beyond the walls 11 to provide suitable supports to prevent tilting of the trough.

The end members 12 are connected with the side members 11 through the medium of hook bolts 13 having retaining nuts 14. This facilitates assembly and replacement of parts. The end members 12 afford anti-rocking supporting devices for the entire trough. The trough also includes an overhead guard or grid structure generally denoted by the numeral 15 and this comprises a horizontal beam or reach bar 16 and longitudinally spaced inclined spacing bars 17, the latter being attached to the side walls of the trough proper. This guard prevents the animals from climbing into the trough and contaminating the food contents.

The tank 8 comprises a suitable hopper or container 18 of appropriate proportions and shape whose end wall 19 is provided on its upper end with a removable staple 20. The opposite end wall 21 is provided adjacent its bottom with an internally screw-threaded rigidly mounted bushing 22 into which the discharge tube or sleeve 23 is removably threaded. This constitutes the inclined gravity discharge spout for the contents of the tank. This pipe 23 is of appropriate length to extend through the fence and discharge in the trough. It is removable so as to permit it to be replaced by a closing plug (not shown) and to permit the tank to be employed for other purposes on the farm.

When used as shown in Figure 4, I provide a tapered plug valve 24, which may be arranged to completely or partially close the spout as desired. In other words, it may be partly left open to permit gradual seepage or drainage or completely closed to cut off the supply of food. This plug is carried by depending links 25 pivotally mounted at 26 on an attaching bracket or fixture 27. The numerals 28 designate spaced keeper eyes, with which the hooked ends of a duplex connector 29 connect.

The duplex connector 29 is carried by the lower end portion of an operating lever 30 and this lever has a dual eye coupling at 31 which operatively connects it with the valve 24 to permit the valve to be pushed in or out for regulation purposes. Mounted in the opposite end portion of the hopper 18 is a cross rod 32 on which a paddle 33 is rockably mounted. This paddle constitutes an agitator and is provided with passages or ports 34. Moreover at its opposite ends it is provided with actuating arms 35 having finger rings 36. By catching hold of these finger rings and working the paddle back and forth, it will mix and agitate the contents of the hopper to facilitate discharge.

Incidently, when the lever 30 is not in use, this can be swung back and hooked under the aforesaid removable staple 20. Moreover, if desired, a retaining pin 37 as seen in Figure 3 may be passed through a hole in the working end of the lever, said pin being attached to the end wall of the hopper by retaining cords 38.

The cover of the hopper comprises a pair of companion lids 39 appropriately shaped to accommodate the internal mechanism and hingedly mounted on the body of the hopper as indicated at 40. The numeral 41 in Figure 2 merely designates a fastener for the lid.

The primary structural features of the organization to be noted are these. In the first place, the feed receiving trough is located in a pen or on one side of a dividing fence and supported on the extensions are the concrete foundation. Secondly, the food and watering container or tank is located on the elevated part of the concrete foundation on the opposite side of the fence, thus making it possible for the attendant to insert the feed and to agitate it when necessary without interference from the hogs feeding from the trough.

The trough is individual in that the parts thereof are appropriately proportioned and shaped to facilitate manufacture and assembly and to prevent tilting. Moreover, the presence of the openwork grid-like guard aids in preventing contamination of the food by preventing the animals from climbing into the trough. Moreover, the entire rigging constituting the valve regulating and closing means for the spout is bodily removable so as to permit the tank to be utilized for other purposes on the farm. Then too, the sleeve constituting the discharge spout is removable and replaceable by a closing plug whenever necessary or desired.

In addition, the presence of the apertured board on the interior of the hopper constitutes a convenient agitator for mixing and aiding in discharging the contents from the tank into the trough. All of these details have been especially selected and accurately organized to permit the device to fulfill the requirements of a structure of this class in a highly satisfactory simple and economical manner.

It is thought that the description taken in connection with the drawings will enable a clear understanding of the invention to be had. Therefore, a more lengthy description is thought unnecessary. While the preferred embodiment of the invention has been shown and described, it is to be understood that minor changes coming within the field of invention claimed may be resorted to if desired.

I claim:

Means for introducing feed into a trough located in a hog pen comprising an elevated foundation located outside of the pen, a tank removably supported on the foundation for receiving the feed, a bushing in one side of the tank at the bottom thereof and provided with a threaded and inwardly and upwardly sloping bore, a spout having one end threaded in the bore, said spout passing through a wall of the pen and resting on one end of the trough for discharging into the trough, a valve member for closing the inner end of the spout, a hand lever projecting from the tank and connected with the valve member for moving the same to open and closed position, and an agitator in the tank for agitating the food therein.

In testimony whereof I affix my signature.

WILLIAM HODKINSON.